United States Patent Office.

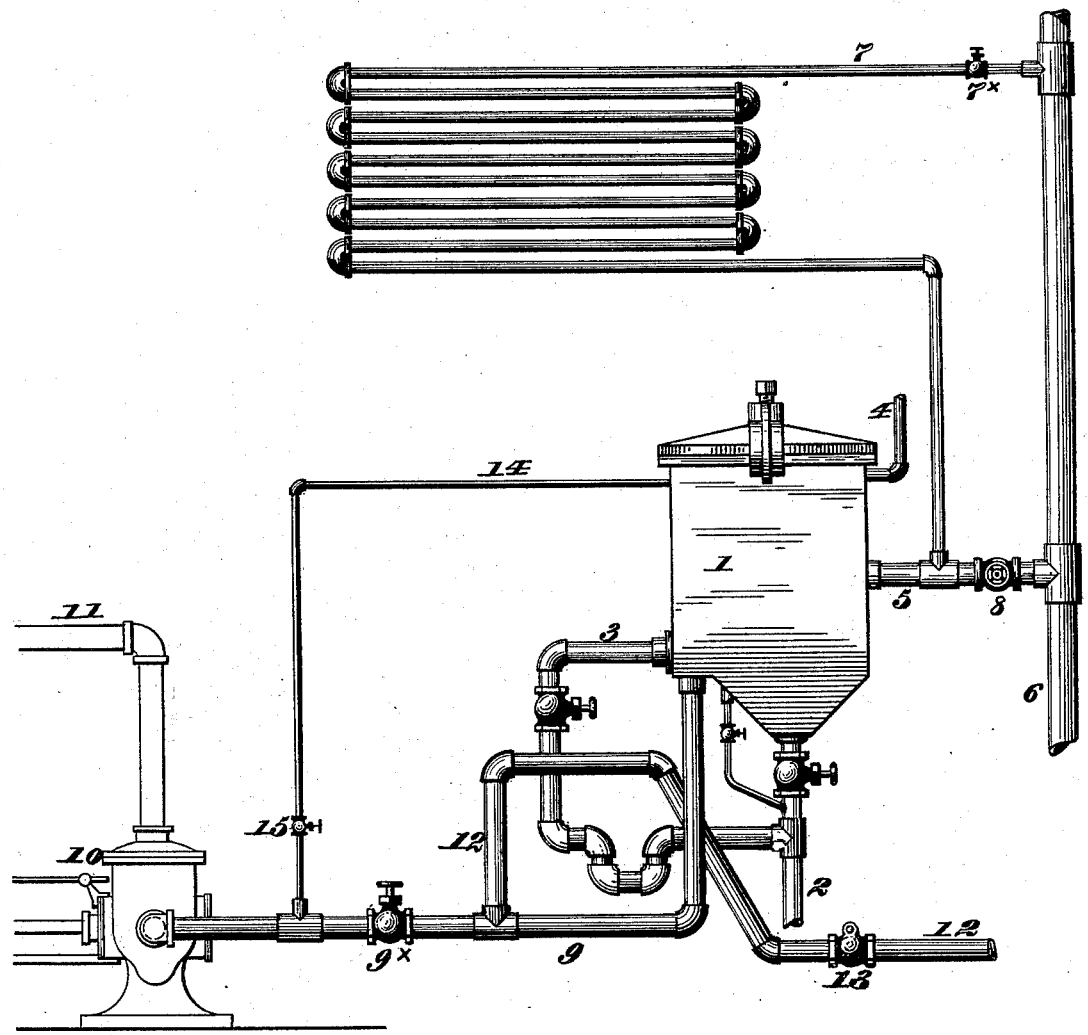

WARREN WEBSTER, OF PHILADELPHIA, PENNSYLVANIA.

FEED-WATER HEATER AND PURIFIER.

SPECIFICATION forming part of Letters Patent No. 396,971, dated January 29, 1889.

Application filed September 13, 1888. Serial No. 285,327. (No model.)

*To all whom it may concern:*

Be it known that I, WARREN WEBSTER, a citizen of the United States, residing in the city and county of Philadelphia, State of Pennsylvania, have invented a new and useful Improvement in Feed-Water Heaters and Purifiers, which improvement is fully set forth in the following specification and accompanying drawing.

My invention relates to improvements in feed-water heaters and purifiers; and the object of the invention is to provide an apparatus which utilizes exhaust-steam after the said steam has passed through heating-coils or outlying branch pipes communicating with the exhaust-pipe of an engine or other steam-supply for heating and purifying water for boiler-feeding or manufacturing purposes.

This is an improvement upon my former applications, as it provides means for keeping the space above the water in the purifier below atmospheric pressure at all times without compelling all of the water that is purified to pass through the pump before being able to utilize the suction power of the pump in removing the air which is being liberated continually from the water entering to be heated and purified.

To attain this object the invention consists of a suitable tank, receiver, or vessel provided with a water-supply and steam supply and discharge communicating with a suitable pump for maintaining a partial vacuum in the purifier at all times.

The invention further consists in a purifying-chamber having a water-supply, steam supply and discharge, and means for removing the air from the purifying-chamber and for carrying off the superfluous water.

The invention finally consists in the novel construction, arrangement, and adaptation of the elements comprising the apparatus, all as hereinafter described and specifically claimed.

The figure of the drawing represents a side elevation of a feed-water heater and purifier constructed in accordance with and embodying my invention.

Referring to the drawing, the numeral 1 designates the purifying and heating chamber, tank, or reservoir; 2, the sediment-discharge pipe thereof, and 3 the overflow-pipe leading to the sediment-discharge pipe.

4 designates the feed-pipe for supplying cold water to the chamber or reservoir 1, which enters said chamber near the top thereof.

5 designates the steam-supply pipe communicating with the chamber or reservoir, and leading from the exhaust-pipe 6 of an engine is a heating-pipe passing through a building and communicating with the exhaust-pipe of an engine or other steam supply, and is provided with cocks or valves 7 8.

9 designates the supply-pipe leading from the chamber or reservoir to a suitable pump, 10, having a delivery-pipe, 11, for supplying the pure heated water or any portion of it to a boiler or elsewhere, as desired.

The supply-pipe 9 is provided with a cock or valve, $9^\times$, and leading from the delivery-pipe is a branch pipe, 12, for conveying superfluous water to a storage-tank or elsewhere to be used for suitable purposes, and the pipe 12 is provided with a check-valve, 13, operated by the water passing through said pipe.

14 designates a pipe communicating with the chamber or reservoir and leading to the supply-pipe 9 for removing the air from the chamber or reservoir, and said pipe 14 is provided with a cock or valve, 15.

The operation is as follows: Water is admitted to the chamber or receiver. The action of the pump draws the pure water out through the supply-pipe, removes the air from the chamber or receiver, and maintains a partial vacuum therein. If a greater quantity of water is being purified than is drawn from the chamber or receiver by the pump, the over-amount will pass out through the branch pipe through the check-valve to a suitable storage-vessel or elsewhere. By this construction I am enabled to regulate the valves in the supply and outlet pipes to draw as much air and water through them as desired, and thus insure a partial vacuum within the purifier at all times and also the proper heating and purifying of the water.

It will be seen that my apparatus will draw water out of the receiver and at the same time utilize a part of the suction of the pump in drawing off the air, which is liberated from the water entering to be heated and purified, in order to keep the space within the purifier below atmospheric pressure, whereby I am able to purify the water more thoroughly from the fact that the molecules of water repel each other more strongly, and consequently precipitate the sediment held in solution more quickly, than if the space within the purifier was allowed to be in equilibrium with the atmosphere.

The advantage of my apparatus is that I am able to utilize steam after having first passed through heating-pipes in buildings or the like, in addition to the fact that I can so adjust the valves in the pipes as to utilize the suction power of the pump in such a manner as to keep a partial vacuum within the purifier without being compelled to draw all of the water that is purified away by the pump.

I would have it understood that I reserve the right to make minor changes in the construction and arrangement of the parts of the apparatus without sacrificing any of the advantages or departing from the spirit of the invention.

The overflow-pipe 3 is formed with a trap, the purpose of which is to prevent the return of air through said pipe to the purifier.

Having thus described my invention, what I claim as new, and desire to secure by Letters Patent, is—

1. In a feed-water heater and purifier, the combination of a tank or receiver, a steam-supply pipe, a supply-pipe leading from the tank or receiver to a pump, and an air-outlet pipe leading from the tank or receiver to the supply-pipe, whereby the action of the pump draws the water and air from the tank or receiver and draws steam into the tank or receiver, substantially in the manner and for the purpose described.

2. In a feed-water heater and purifier, the combination of a purifying and heating chamber, a steam-supply pipe, a supply-pipe, a pump communicating with the delivery-pipe, and an overflow branch pipe communicating with the supply-pipe, substantially as and for the purpose described.

3. In a feed-water heater and purifier, the combination, with a tank or receiver having means for supplying water thereto, of the steam-supply pipe having valves, a supply-pipe provided with a cock or valve, and a discharge-pipe leading from the tank or receiver to the supply-pipe, and provided with a valve, and a pump communicating with the supply, all arranged, combined, and operating substantially in the manner and for the purpose described.

4. In a feed-water heater and purifier, the combination of the tank or receiver, a supply-pipe leading therefrom, and a branch pipe communicating with the supply-pipe, and having a check-valve, substantially as described.

5. In a feed-water heater and purifier, the combination of the heating and purifying chamber, a supply-pipe leading therefrom provided with a valve, an air-outlet pipe provided with a valve and communicating with the heating and purifying chamber and the supply-pipe, and a pump communicating with the supply-pipe, all arranged, combined, and operating substantially in the manner and for the purpose described.

WARREN WEBSTER.

Witnesses:
JOHN A. WIEDERSHEIM,
WM. N. MOORE.